(12) United States Patent
Lyngby et al.

(10) Patent No.: US 9,019,682 B2
(45) Date of Patent: Apr. 28, 2015

(54) DISCHARGE APPARATUS FOR A WIND TURBINE

(75) Inventors: Claus Grøn Lyngby, Århus (DK); Hans V. Erichsen, Århus V (DK)

(73) Assignee: Vestas wind Systems A/S, Aarhus (DK)

( * ) Notice: Subject to any disclaimer, the term of this patent is extended or adjusted under 35 U.S.C. 154(b) by 74 days.

(21) Appl. No.: 13/813,917

(22) PCT Filed: Aug. 1, 2011

(86) PCT No.: PCT/DK2011/050295
§ 371 (c)(1),
(2), (4) Date: Apr. 1, 2013

(87) PCT Pub. No.: WO2012/016568
PCT Pub. Date: Feb. 9, 2012

(65) Prior Publication Data
US 2013/0181457 A1    Jul. 18, 2013

Related U.S. Application Data (60) Provisional application No. 61/369,807, filed on Aug. 2, 2010.

(30) Foreign Application Priority Data

Aug. 20, 2010 (DK) ................................. 2010 00692

(51) Int. Cl.
*H01H 47/00* (2006.01)
*F03D 11/00* (2006.01)
*H01T 4/08* (2006.01)

(52) U.S. Cl.
CPC .............. *F03D 11/0033* (2013.01); *H01T 4/08* (2013.01); *Y02E 10/722* (2013.01); *Y02E 10/726* (2013.01)

(58) Field of Classification Search
USPC .......................................... 361/120, 212, 220
See application file for complete search history.

(56) References Cited

U.S. PATENT DOCUMENTS

| 7,390,169 B2 | 6/2008 | Larsen et al. |
| 7,654,790 B2* | 2/2010 | Molbech ........................... 415/1 |
| 2003/0170122 A1 | 9/2003 | Wobben |

FOREIGN PATENT DOCUMENTS

| DE | 4436197 A1 | 4/1996 |
| DE | 4445899 A1 | 6/1996 |
| EP | 1577551 A2 | 9/2005 |
| WO | 2005050008 A1 | 6/2005 |
| WO | 2005114782 A2 | 12/2005 |
| WO | 2009130143 A2 | 10/2009 |
| WO | 2012016726 A2 | 2/2012 |

OTHER PUBLICATIONS

International Search Report dated Feb. 2, 2012 for International Application No. PCT/DK2011/050295, 3 pages.

(Continued)

*Primary Examiner* — Danny Nguyen
(74) *Attorney, Agent, or Firm* — Patterson + Sheridan LLP (57) ABSTRACT

A discharge apparatus for a wind turbine is disclosed that enables electric charge to be discharged between a first and a second part of the wind turbine that are rotatable relative to each other. The discharge apparatus includes a charge transfer unit electrically connected to the first part, and an electrically conductive slideway electrically connected to the second part. The charge transfer unit includes an electrically insulative sliding member that maintains mechanical contact with the slideway, and a spark-gap electrode electrically connected to the first part and that moves in unison with the sliding member over the slideway. The spark-gap electrode and slideway form a spark gap having a spark-gap width controlled by the sliding member. The first and second parts are electrically isolated from each other in the absence of a spark, and discharge occurs by sparks bridging the spark gap.

15 Claims, 6 Drawing Sheets

(56) References Cited

OTHER PUBLICATIONS

DK Search Report dated Mar. 7, 2011 for Application No. PA2010 00692, 1 page.

International Search Report dated Feb. 2, 2012 for International Application No. PCT/EP2011/058920, 3 pages.

U.S. Appl. No. 13/813,922, filed Feb. 1, 2013, national phase entry of International Application No. PCT/EP2011/058920 filed May 31, 2011.

* cited by examiner

DISCHARGE APPARATUS FOR A WIND TURBINE

FIELD OF THE INVENTION

The present invention relates a discharge apparatus for a wind turbine to enable electric charge to be discharged between first and second wind-turbine parts rotatable relative to each other, and to a wind turbine equipped with at least one of these discharge apparatus.

BACKGROUND OF THE INVENTION

In a known lightning arrester system for a wind turbine a gap in the lightning down-conductor between the rotor blade and the nacelle—two parts which are rotatable relative to each other—is bridged by spark gaps, as described in DE 4436197 A1. However, rotor blades of wind turbines will not only be hit by lightning, but may also be subjected to electric charging due the static electricity caused by friction with the air flowing along the blades' surface. Accordingly, US 2003/170122 A1 proposed that a connection to ground is provided in parallel to the spark gaps to enable continuous electric discharging of the blades.

In other types of lightning arrester systems, sliding contacts are used instead of spark gaps, as described in WO 2005/050008 A1. U.S. Pat. No. 7,390,169 B2, FIG. 4, pertains to another arrester system of that type in which a spark gap member is arranged adjacent to and in parallel with a sliding contact in order to prevent the sliding contact from being damaged by lightning. The sliding contact and the spark gap member are mounted commonly in a mounting plate with spacers between the mounting plate and a contact face.

SUMMARY OF THE INVENTION

A discharge apparatus for a wind turbine is provided to enable electric charge to be discharged between a first and a second part of the wind turbine. The first and second parts are rotatable relative to each other. The discharge apparatus comprises a charge transfer unit electrically connected to the first part, and an electrically conductive slideway electrically connected to the second part, and rotatable relative to the charge transfer unit. The charge transfer unit comprises a sliding member made of an electrically insulating material, wherein the sliding member is elastically biased towards the slideway to cause the sliding member to maintain mechanical contact to the slideway; and a spark-gap electrode electrically connected to the first part and arranged to move in unison with the sliding member over the slideway at a distance over the slideway controlled by the sliding member. The spark-gap electrode and the slideway thereby form a spark gap with a spark-gap width controlled by the sliding member due to its elastic bias towards the slideway. Discharging is enabled by sparks bridging the spark gap, whereas the first and second parts are electrically isolated form each other in the absence of a spark.

According to another aspect a wind turbine is provided, comprising at least one discharge apparatus to enable electric charge to be discharged between a first and a second part of the wind turbine. The first and second parts are rotatable relative to each other. The discharge apparatus comprises a charge transfer unit electrically connected to the first part, and an electrically conductive slideway electrically connected to the second part, and rotatable relative to the charge transfer unit. The charge transfer unit comprises a sliding member made of an electrically insulating material, wherein the sliding member is elastically biased towards the slideway to cause the sliding member to maintain mechanical contact to the slideway; and a spark-gap electrode electrically connected to the first part and arranged to move in unison with the sliding member over the slideway at a distance over the slideway controlled by the sliding member. The spark-gap electrode and the slideway thereby form a spark gap with a spark-gap width controlled by the sliding member due to its elastic bias towards the slideway. Discharging is enabled by sparks bridging the spark gap, whereas the first and second parts are electrically isolated from each other in the absence of a spark.

Other features are inherent in the methods and products disclosed or will become apparent to those skilled in the art from the following description and the accompanying drawings.

BRIEF DESCRIPTION OF THE DRAWINGS

Embodiments of the present invention are explained by way of example with reference to the accompanying drawings, in which.

The drawings and the description of the drawings are of embodiments of the invention and not of the invention itself.

DETAILED DESCRIPTION OF EMBODIMENTS

Before turning to the detailed description of the drawings, a few more general items of the embodiments will be discussed.

A spark gap-based conventional grounding system as described in DE 4436197 A1 uses two spark gaps, one between the rotor-blade root and lightning-current-transfer element mounted on the wind-turbine hub, and the other between the lightning-current-transfer element and the nacelle. These spark gaps are formed by electrodes moving over complementary rings or belts mounted around the blade root or at the nacelle. It has been observed that electrostatic charging of the blades may cause flashovers which interfere with electronic equipment. With regard to electromagnetic compatibility (EMC), in certain regions wind power installations have to comply, for example, with the emission standard for industrial environments IEC61000-6-4 issued by the International Electrotechnical Commission (IEC). To resolve the EMC issue, US 2003/170122 A1 provides a connection to ground in parallel to the spark gaps to enable continuous electric discharging of the blades.

It has been observed in the context of the present invention that continuous-discharging connections based on sliding contacts, such as described in WO 2005/050008 A1 and U.S. Pat. No. 7,390,169 B2, may also produce electromagnetic radiation with a high bandwidth, radiated by the wind-turbine blades acting as a big antenna. A possible explanation of this might be as follows: A sliding connection may be repeatedly interrupted for short time intervals. This might be due to the contact slider lifting off its complementary contact surface, thereby momentarily interrupting the current path. Owing to the inductance of the total current path and due to accumulation of electric charges in the rotor blades, any such interruption of the current flow may induce a relatively high voltage which, in turn, may cause sparking flashovers at the sliding contacts, resulting in the radiation of electromagnetic waves, i.e. broad-band electromagnetic interference.

It has been recognized by the present inventors that by interrupting a continuous-discharge path by a spark gap can reduce the radiation of electromagnetic waves. This is contrary to the teaching of DE 4436197, probably due to the fact that the width of the spark gaps of DE 4436197 may vary significantly. Since the parts which define the spark-gap width in a system of the type described in DE 4436197 are mounted to very big rotatable parts which may have a certain eccentricity and are subjected to changing moments and forces, it can be assumed that the spark-gap distance is relatively big, and may vary between 10 and 20 mm. This may cause flashover voltages to be in the range between about 20 and 50 kV. It has been recognized by the present inventors that the radiation of electromagnetic waves can be reduced by interrupting a continuous-discharge path by a spark gap with a sufficiently small and controlled spark-gap width. Control of the spark-gap width ensures that the spark-gap width is always sufficiently small and does not significantly vary upon rotation or load changes.

In the embodiments described herein, a spark gap is provided with electrodes which rotate relatively to each other. The discharge apparatus allows electric charge to be discharged between a first and a second part of the wind turbine (e.g. between the blade and the nacelle) by sparks bridging the spark gap. However, the first and second parts are electrically isolated from each other in the absence of a spark. To this end, the sliding member is made of an electrically insulating material. Electric isolation of the first and second parts in the absence of a spark also means that the spark gap is not connected in parallel with an electric-contact slider, roller, or any other element providing a permanent electric connection, to prevent the electric-contact slider from being damaged by lightning current, as, e.g., described in U.S. Pat. No. 7,390,169 B2.

In the embodiments, the spark-gap width is relatively small and it is maintained to be such small, even though the slideway may be eccentric or uneven; that is to say it is, e.g. in a range from about 2 mm to about 8 mm. In some embodiments, the spark-gap width is even in a range from about 3 mm to about 6 mm. Due to the smaller width and the reduced width-variation of the spark gap, the flashover voltages are lowered, and the electromagnetic energy radiated during each flashover is reduced, without using a permanent discharge path. In other embodiments, the discharge apparatus may comprise a spark-gap width in a larger range. Such a discharge apparatus could be used in a wind turbine with longer blades, such blades generating more static electricity with each rotation. A larger spark gap width may thus be needed to regulate the discharge.

The embodiments of the discharge apparatus include an electrically conductive slideway, with one or more sliding members being elastically biased towards the slideway. The elastic bias causes the sliding member(s) to maintain mechanical contact to the slideway, even if the slideway is eccentric or uneven. The spark-gap electrode is arranged to move unison with the sliding member over the slideway at a distance over the slideway controlled by the sliding member. "Controlled by the sliding member" means that if the sliding member moves up or down (e.g. due to unevenness of the slideway) the spark-gap electrode also moves up, or down, to the same extent. Thereby the spark-gap electrode—although it does not contact the slideway—will trace any eccentricity or unevenness of the slideway. In this way the sliding member keeps the spark-gap width relatively constant.

So far the focus has been on the functionality of discharging static charges. In some of the embodiments, however, the discharge apparatus is, on the one hand electrically connected to one or more lightning receptors (e.g. at the blade tip and along the length of the blade) and on the other hand with ground (e.g. via a lightning down-conductor on the exterior of the nacelle and the tower). The charge transfer unit is arranged to withstand the high current and thermal stress that typically occurs during a lightning strike.

In some of the embodiments, the insulating material of the sliding member is electrically insulating plastics. Typically, insulating plastics exhibits a conductivity of less than $10^{-8}$ S/cm. Plastics materials especially suitable in terms of electric and mechanic properties and durability are, for example, polyamide (Nylon®), polyoxymethylenes (POMs), Vesconite®, ultra high molecular weight polyethylene (UHM-WPE). In some embodiments, the sliding member may be a roller to further reduce friction. The slideway surface may, for example, be made of steel, e.g. with a copper or aluminium core.

In some embodiments the sliding member and the spark-gap electrode are rigidly coupled to cause the spark-gap electrode to move in unison with the sliding member. In some of these embodiments the coupling is direct, i.e. without intermediate elements between the sliding member and the electrode. In other embodiments the sliding member and the electrode are coupled in an indirect manner, i.e. through intermediate elements between the sliding member and the electrode. To space apart the spark-gap electrode from the slideway, the spark-gap electrode is recessed away from the sliding surface of the sliding member by a recess distance. As the sliding member slides on the slideway with its sliding surface and thereby follows the eccentricity and unevenness of the slideway, the distance by which the spark gap is recessed relative to the sliding surface corresponds to the spark-gap distance.

The elastic bias towards the slideway can be realised in different alternative ways. For example, in some embodiments a spring is provided to urge the sliding member towards the slideway. In other embodiments an elastically deformable flat strip is provided. The strip is mounted in an elastically deformed position so that is elastic biases the sliding member towards the slideway. As the function of the bias is to maintain the sliding member on the slideway (but no electrical contact of the sliding member to the slideway has to be ensured), the contact force can be smaller than the contact force usually applied to a corresponding conductive sliding contact to ensure sufficient electric contact. Thus, wear of the sliding member can be reduced. The deformable strip may be made of a flexible material such as glass fiber reinforced plastics. In some embodiments the deformable strip is made of non-conductive material which enables the charge transfer unit to be electrically isolated from the base to which it is mounted (which can be, for example, the wind-turbine hub).

In some embodiments, the sliding member has a cavity, which is open towards the slideway, with the spark-gap electrode being located within the cavity. As the cavity is open towards the slideway, the sparks can develop between the spark-gap electrode and the slideway through the opening of the sliding member towards the slideway. In some embodiments, the spark-gap electrode is electrically connected to the first or second part through the rear side of the cavity. In some embodiments a metal rod, for example made of brass, projects through the rear side of the cavity into the cavity. The electrode is, in some embodiments, formed as a tip, fixed to the inner end of the metal rod. The electrode is made of a high-temperature resistant metal, for example, tungsten. The outer end of the metal rod is, for example, connected to a cable coupled to the first or second part.

Once a spark is fired in the cavity, in particular upon lightning strike, the air in the cavity may expand suddenly. To let the air escape, in some embodiments the cavity has at least one relief opening leading from the inside of the cavity to the outside. In some embodiments there are two relief openings at opposite sides of the cavity so that the recoil of the escaping air streams is compensated. In some embodiment, the relief opening(s) lead(s) to the outside between the slide member and the slideway. In other words, the relief opening(s) has (have) the form of a recess in the sliding surface of the wall of the cavity.

In some of the embodiments, the relief opening(s) is (are) oriented parallel to the sliding direction (the "sliding direction" is the direction in which the sliding member is movable relative to the slideway). This orientation prevents particles of material sputtered away from the spark-gap electrode or the slideway and blown outwardly in a relief opening from depositing on those surface regions of the slideway which are swept by the sliding member. This prevents the surface quality of the swept sliding surface from being degraded which might cause early wear of the sliding member.

In some embodiments discharge apparatus not only has one sliding member and one associated slideway, but two sliding members with two associated slideways. This is useful, for example, if the first and second parts are rotatable relative to each other around two different rotation axes. The first slideway is electrically connected to the sec- and part, and the second slideway is electrically connected to the first part. The two sliding members are connected end-to-end in series. In some embodiments both slide members are of the isolating type with a spark gap. However, in other embodiments only the first slide member is of the isolating type with a spark gap, while the second slide member is made of electrically conductive material and mechanically contacts the second slideway, and thereby provides permanent electric contact between the first part and the spark-gap electrode.

In some embodiments, the discharge apparatus with two sliding members and two slideways is arranged between the rotor blade and the nacelle of the wind turbine. It enables charges to be discharged from the rotor blade to ground via the nacelle. The discharge apparatus is mounted on the hub, and rotates with the hub; however, both sliding contacts and a cable connection between them are electrically isolated from the hub, so that discharge current bypasses the hub the blade and rotor bearings. Two different embodiments with the two different orientations of the discharge apparatus with one isolating and one conducting sliding member are possible. For example, in one of these orientations the rotor blade is the "first part" and the nacelle is the "second part". In other words, the electrically conducting sliding member provides connection to the rotor blade and the electrically insulating sliding member with the spark gap provides connection, upon spark occurrence, to the nacelle. During one full revolution of the rotor the length traveled by the isolating sliding member towards the nacelle over its slideway is 360° times the diameter of slideway at the nacelle, while the length traveled by the conducting sliding member towards the blade over its associated slideway is usually only a few degrees (corresponding to the pitch adjustment during one revolution) times the diameter of the slideway at the blade; the latter length of travel is usually about ¹/₁₀₀ or less of the first travel length. As the insulating sliding member exhibits less wear than the conducting sliding member, the embodiment of the discharge apparatus with the orientation with the electrically insulating sliding member at the nacelle and the conduction sliding member at the blade arranged ratio, of the length of the conducting member towards the nacelle has an extended lifetime.

Moreover, in some of these embodiments the elastic bias (i.e. the elastic contact force) of the second, electrically conducting sliding member towards the second slideway is greater than the elastic bias of the electrically insulating sliding member with the spark gap to its associated slideway. The greater contact force applied to the conducting sliding member is to ensure good electric contact, while the lower contact force applied to the isolating sliding member is possible because there the contact force only has to ensure that the sliding element is maintained on the surface of the slideway. This is another measure to reduce wear at the sliding contacts of the discharge apparatus.

Figure 1:
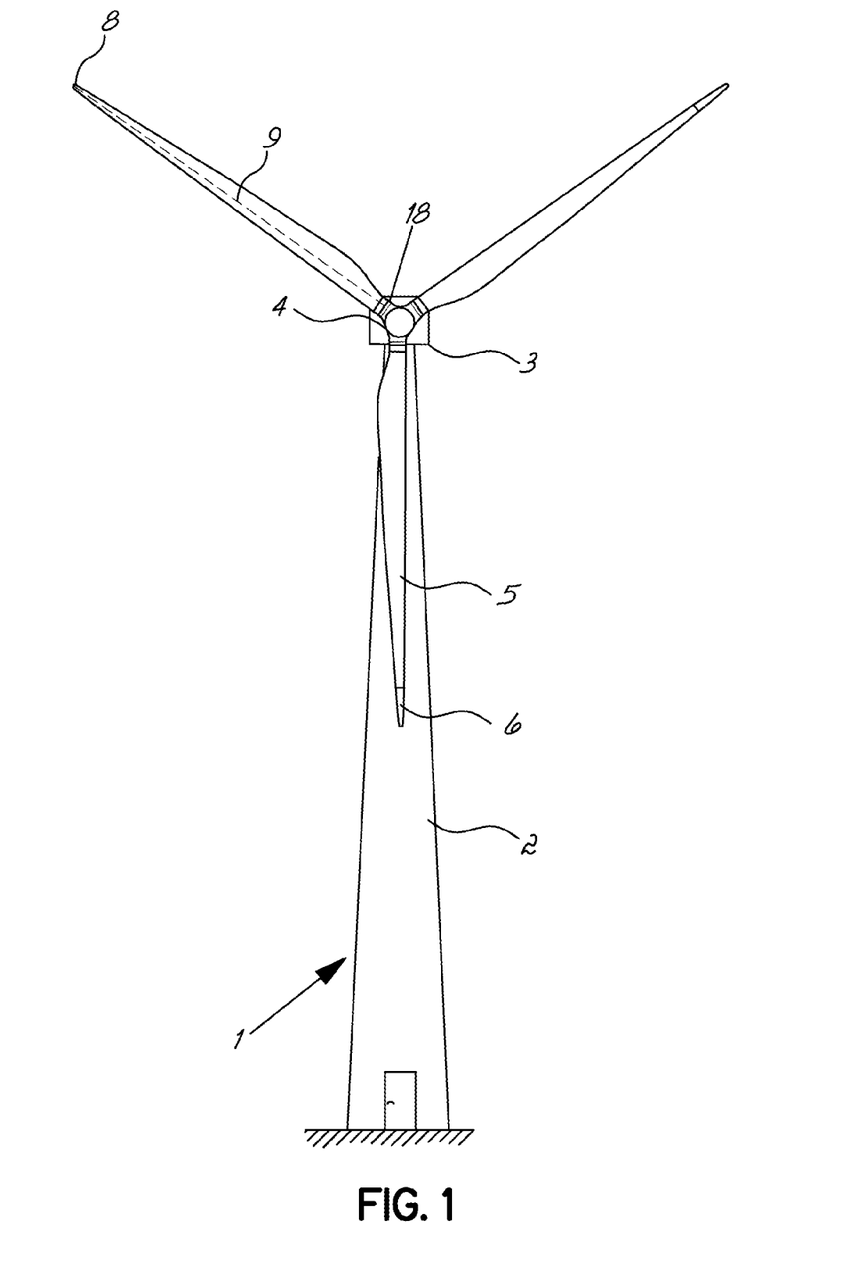
FIG. 1 illustrates an embodiment of a wind turbine with wind turbine blades and a lightning arrester system.
Figure 2:
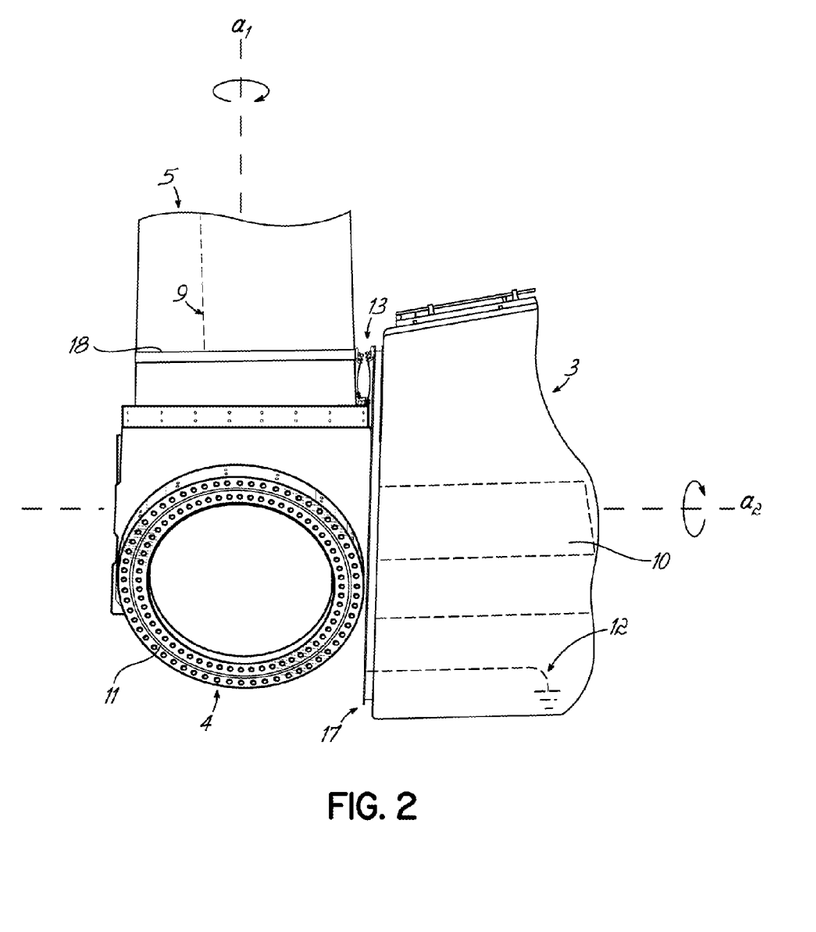
FIG. 2 illustrates the hub portion of the wind turbine of FIG. 1, including the charge transfer region.

Returning now to the figures, FIG. 1 shows an embodiment of a wind turbine 1 with a nacelle 3 mounted by means of an azimuth bearing on a tower 2. The wind turbine 1 has three rotor blades 5 mounted pitch-adjustably on a hub 4 by means of blade (or pitch) bearings 11 (FIG. 2). The hub 4 is e.g. mounted on a main shaft 10 (FIG. 2) supported by main-shaft bearings in the nacelle 3

A grounding system protects the mechanic and electronic equipment from damage, e.g. by lightning strikes, and prevents the rotor blades 5 from accumulating static charges. The tips 8 of the wind turbine blades 5 are equipped with lightning receptors 6 electrically connected to the root of the rotor blades 5 by a down conductor 9 leading internally along the blades 5. Further lightning receptors connected to the down conductor 9 are distributed over the length of the blades 5. In some embodiments the blades 5 are partly covered with conducting meshes connected to the down conductor 9.

The rotor blade is made of electrical non-conducting material, such as glass fiber reinforced plastics. The receptors will not only be hit by lightning, but will also collect static charges In a more detailed view of the hub region in FIG. 2 the hub 4, a blade bearing 11, a root part of a rotor blade 5 and the adjacent part of the nacelle 3 is illustrated. The hub 4 is fixed on the main shaft 10 and rotates with it. The main shaft 10 rotates around an (nearly) horizontal axis, while the rotor blades 5 are rotatable around their (non-stationary) longitudinal axes $a_1$ which are perpendicular to the main-shaft axis $a_2$. Thus, seen in the perspective of an observer on the rotor, a rotor blade 5 and the nacelle 3 rotate around two different (perpendicular) axes $a_1$, $a_2$ (FIGS. 2, 3).

A charge transfer unit 13 is mounted on the hub 4 between the root of each blade 5 and the nacelle 3. It enables charges to be transferred directly from the blade 5 to the nacelle 3, thereby bypassing the hub 4. Each rotor blade 5 has a conductive slideway 18 arranged around its root and internally connected to the down conductor 9. In embodiments with the blades 5 made of non-conducting material, there is no electric connection between the blade slideway 18 and the hub 4. The side of the nacelle 3 facing the hub 4 is equipped with a conductive slideway 17 around the main-shaft opening of the nacelle 3, which is electrically connected to a down conductor on the exterior of the nacelle 3 and the tower 2 to ground 12. What is called a "discharge apparatus" is formed by a charge transfer unit 13, its associated blade slideway 18 and the nacelle slideway 17. As a charge transfer unit 13 is provided for each rotor blade 5, the nacelle slideway 17 is shared between three discharge apparatus, and transfer units 13.

Figure 3:
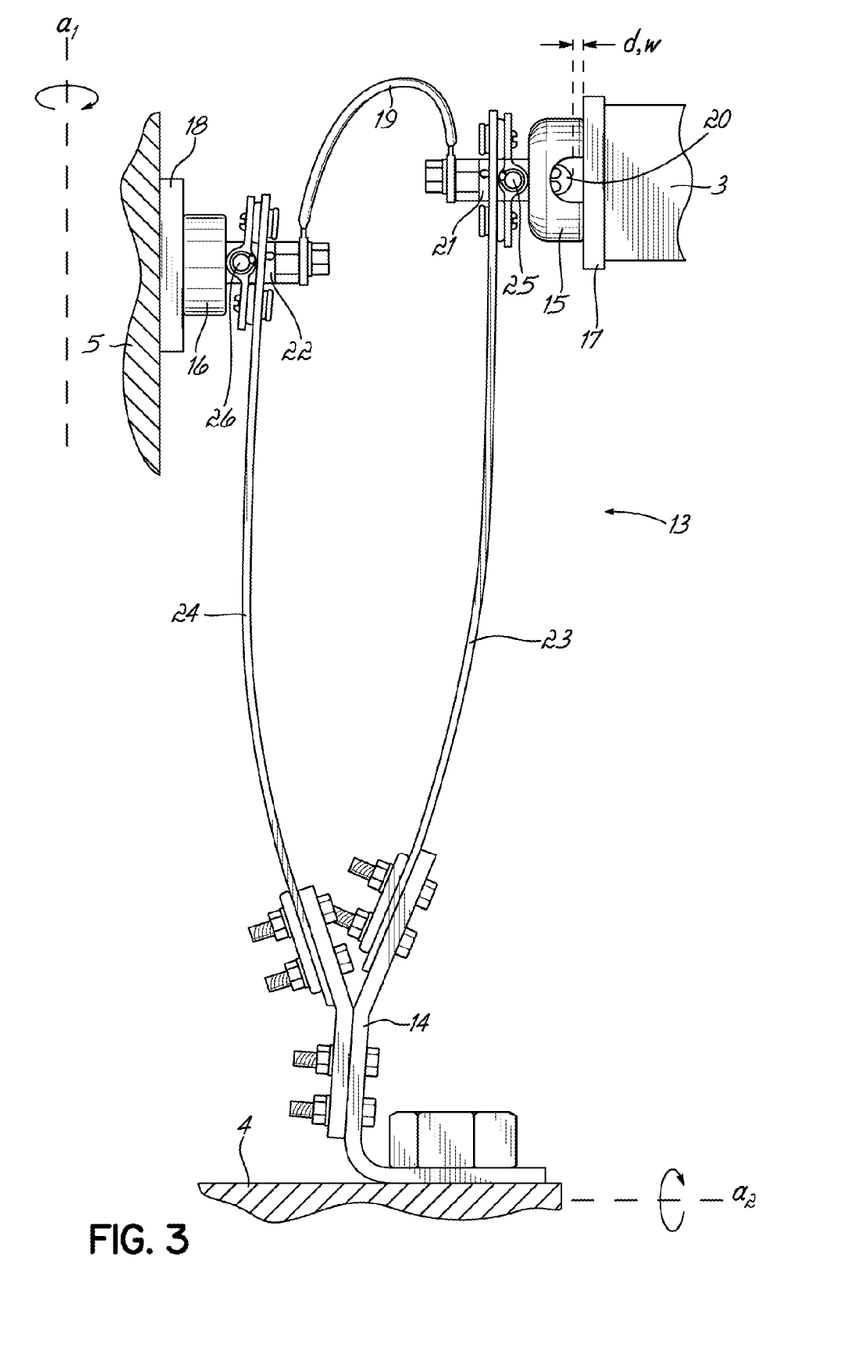
FIG. 3 illustrates a first embodiment of a discharge apparatus.

The discharge apparatus of FIG. 3 includes charge transfer unit 13 with a sliding member 15 sliding on the nacelle slideway 17. The charge transfer unit 13 has a base support 14 fixedly mounted to the rotor hub 4. Thus, the charge transfer unit 13 rotates with the main shaft. The sliding member 15 is mounted to one end of an elastically deformable strip 23 of electrically insulating material which is—at the other end—mounted to a mounting flange of the base support 14. This mounting flange projects towards the nacelle 3, so that the 23 is bent such that it elastically biases the sliding member 15 towards the nacelle slideway 17.

The sliding member 15 is integral piece of electrically insulating plastics, manufactured from a single piece of plastics obtained, e.g., by moulding. The sliding member 15 is not produced by assembling originally separate pieces or elements. The charge transfer unit 13 further has a metal rod 21 with a spark-gap electrode 20 at the tip of the metal rod 21 towards the nacelle slideway 17. The metal rod 21, the spark-gap electrode 20, and the sliding member 15 form a rigid unit. This unit is pivotable around a swivel axis 25 to ensure that the sliding member 15 applies flat to the nacelle slideway 17. The spark-gap electrode is recessed in the sliding member 15, e.g., by a recess distance d of 3-6 mm. By forming a rigid unit with the sliding member 15, the spark-gap electrode 20 moves in unison with the sliding member 15 over the nacelle slideway 17, at distance w from the slideway surface (called the "spark-gap width") controlled by the sliding member 15. The spark-gap width w corresponds to the recess distance d.

Figure 4A:
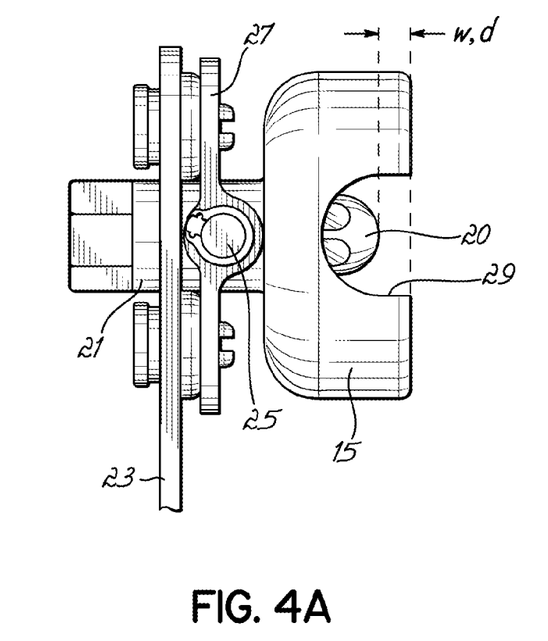
FIGS. 4a and 4b provide a side view and a perspective view of an embodiment of a sliding member and spark-gap electrode.
Figure 4B:
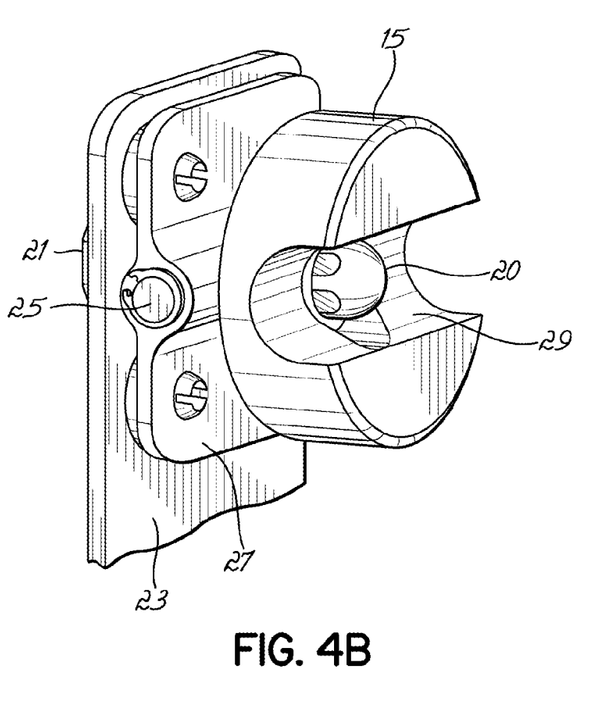

The unit formed by the metal rod 21, the sliding member 15, and the spark-gap electrode 20 is mounted on an intermediate support 27 (FIGS. 4a, 4b) which is, in turn, coupled to the deformable flat strip 23 by means of snap-in coupling, which facilitates ease of removal. Other forms of coupling are possible.

The spark-gap electrode is located within a cavity 29 formed by the sliding member 15. The cavity has lateral relief openings which enable air to expand heated by a spark. The relief openings are oriented in parallel to the sliding direction (which is perpendicular to the paper plane in FIG. 3). This orientation prevents particles of material sputtered away from the spark-gap electrode 20 or the nacelle slideway 17 and blown outwardly in the relief openings from depositing on that surface region of the nacelle slideway 17 which are swept by the sliding member 15.

The spark-gap width w of a new charge transfer unit is, e.g., 6 mm. Due to wear the spark-gap w width can be reduced, e.g., to 3 mm. As mentioned above, the rigid unit is removably coupled to the deformable flat strip 23. At necessary maintenance intervals, the entire rigid unit, or just the sliding member 15, may be removed from the charge transfer unit 13 and be replaced.

Figure 6A:
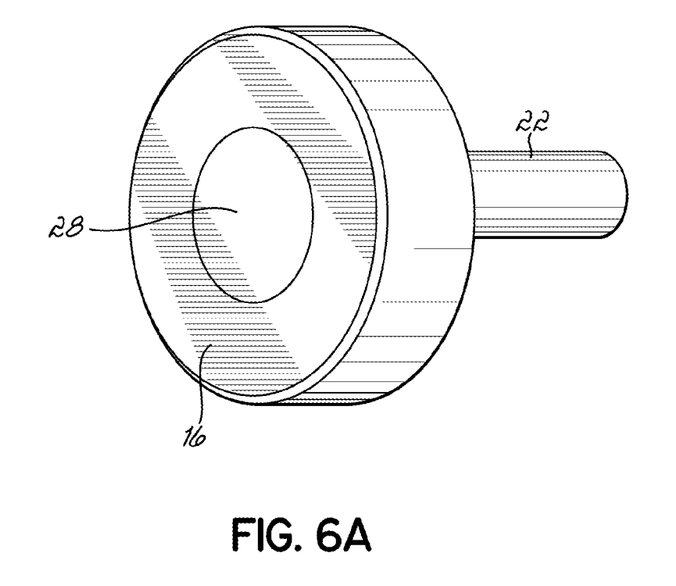
FIGS. 6a and 6b are perspective front and rear views of an embodiment of a conducting sliding member, used in FIG. 3 to contact a second slideway shown in FIG. 3.

The blade slideway 18 is a part of the discharge apparatus of FIG. 3, and the charge transfer unit 13 has a second sliding member 28 (FIG. 6a) contacting the blade slideway 18.

Figure 6B:
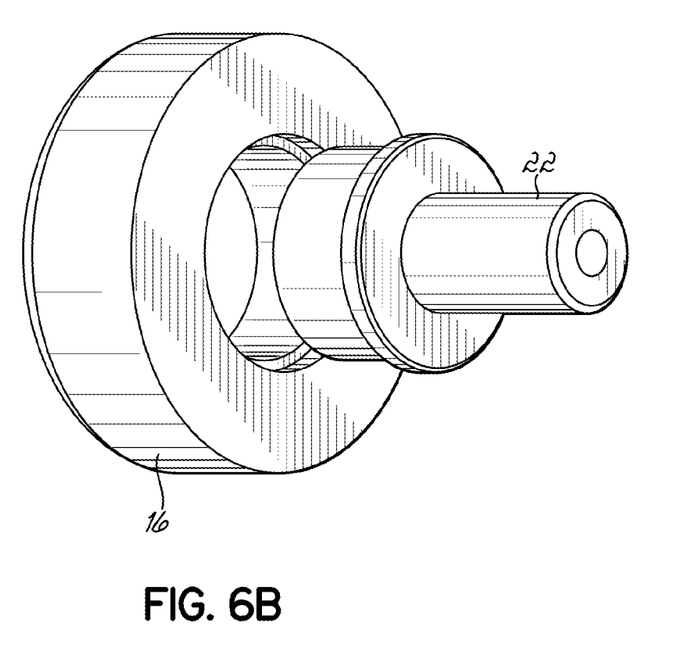

The second sliding member 28 is made of conductive material, e.g. metal. The conductive sliding member 28 mechanically contacts the blade slideway 18, and thereby provides permanent electric contact with the slideway 15. It is laterally enclosed by a wear pad 16 (FIG. 6a, 6b) made of non-conductive plastics. The wear pad 16 enlarges the sliding surface and thereby reduces wear. The conductive sliding member 28 is mounted to a metal rod 22 which corresponds to the metal rod 21 of the spark-gap electrode 20.

The conducting sliding member 28 is elastically biased towards the blade slideway 18 and mounted to the base support 14 in a manner corresponding to that of the isolating sliding member 15: The sliding member 28 is pivotable around a swivel axis 26. It is mounted on an elastically deformed strip 24 made of insulating material, the strip being mounted on an outwardly projecting flange of the base support 14. The sliding member 28 is thereby elastically biased towards the blade slideway 18. There is one difference however: the contact force biasing the isolating sliding member 15 towards its slideway is smaller than that of the conducting sliding member 28.

The rods 21, 22 of the two sliding members 15, 28 are electrically connected by a cable 19, thereby providing a direct discharge path from the blade 5 to the nacelle 3, bypassing the hub 4.

Due to the fact that the sliding member 15 is made of insulating material and the spark-gap electrode 20 does not contact the nacelle slideway 17 (but is recessed by the distance d) the blade 5 and the nacelle 3 are electrically isolated from each other in the absence of a spark bridging the spark gap. No conductive element (slider, roller, etc.) is present connected in parallel with the spark gap, which could electrically bridge the spark gap.

Figure 5:
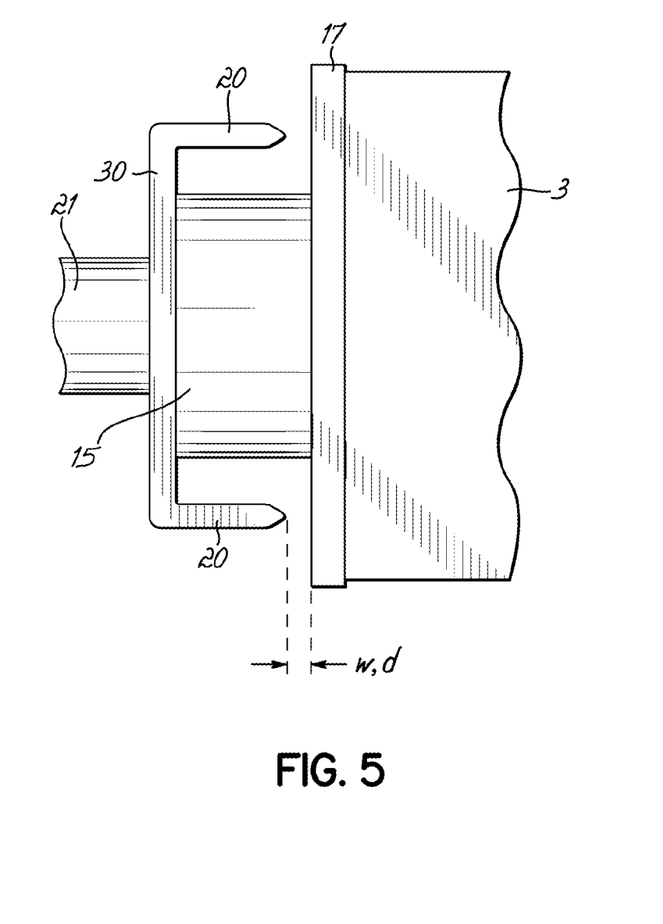
FIG. 5 is a side view of an alternative embodiment of a sliding member with spark-gap electrodes.

In an alternative embodiment according to FIG. 5 the relative arrangement of the sliding member 15 and the spark-gap electrode 20 is interchanged: the sliding member is now arranged in the center of spark-gap electrode 20 (actually formed by two electrodes 20).

All publications mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A discharge apparatus for a wind turbine to enable electric charge to be discharged between a first and a second part of the wind turbine, the first and second parts being rotatable relative to each other, the discharge apparatus comprising:
    a charge transfer unit electrically connected to the first part, and
    an electrically conductive slideway electrically connected to the second part, and rotatable relative to the charge transfer unit;
    the charge transfer unit comprising:
        a sliding member of an electrically insulating material and elastically biased towards the slideway to cause the sliding member to maintain mechanical contact with the slideway; and
        a spark-gap electrode electrically connected to the first part and arranged to move in unison with the sliding member over the slideway at a distance over the slideway controlled by the sliding member,
    the spark-gap electrode and the slideway thereby forming a spark gap with a spark-gap width controlled by the sliding member due to its elastic bias towards the slideway, wherein discharging is enabled by sparks bridging the spark gap, whereas the first and second parts are electrically isolated from each other in the absence of a spark.

2. The discharge apparatus according to claim 1, the discharge apparatus being electrically connected with at least one lightning receptor and with ground.

3. The discharge apparatus according to claim 1, wherein the electrically insulating material of the sliding member is an insulating plastic.

4. The discharge apparatus according to claim 1, wherein the only current path provided between the first and the second parts includes the spark gap without a permanent electric contact existing between the first and the second parts in parallel with the spark gap.

5. The discharge apparatus according to claim 1, wherein the spark-gap width is from about 2 mm to about 8 mm.

6. The discharge apparatus according to claim 1, wherein the sliding member has a sliding surface,
the sliding member and the spark-gap electrode are rigidly coupled in a direct or indirect manner,
the spark-gap electrode is recessed from the sliding surface of the sliding member by a recess distance,
the sliding member following a contour of the slideway, thereby maintaining a constant distance between the spark-gap electrode and the slideway, the constant distance corresponding to the spark-gap width and to the recess distance.

7. The discharge apparatus according to claim 1, wherein the sliding member is mounted on an elastically deformable flat strip, the strip being deformed and exerting the elastic bias towards the slideway.

8. The discharge apparatus according to claim 1, wherein the sliding member forms a cavity that is open towards the slideway and within which the spark-gap electrode is located.

9. The discharge apparatus according to claim 8, wherein the cavity includes at least one relief opening leading from the cavity to the outside of the sliding member and formed between the sliding member and the slideway.

10. The discharge apparatus according to claim 9, wherein relative motion of the sliding member and the slideway defines a sliding direction, and
wherein the relief opening is oriented parallel to the sliding direction.

11. The discharge apparatus according to claim 1, wherein the discharge apparatus comprises a second slideway, electrically connected to the first part, and the charge transfer unit comprises a second sliding member electrically connected in series with the spark-gap electrode of the first sliding member,
wherein the second sliding member is made of electrically conductive material and mechanically contacts the second slideway, providing a permanent electric contact between the first part and the spark-gap electrode.

12. The discharge apparatus according to claim 11, wherein the wind turbine includes at least a first rotor blade and a nacelle, and
the discharge apparatus is arranged between the first rotor blade and the nacelle, and enables electric charge to be discharged from the first rotor blade to ground via the nacelle.

13. The discharge apparatus according to claim 12, wherein the first rotor blade is the first part and the nacelle is the second part, and
wherein the electrically conducting sliding member provides electrical connection to the first rotor blade, and the electrically insulating sliding member with the spark gap provides connection, upon occurrence of sparks, to the nacelle.

14. The discharge apparatus according to claim 11, wherein the second electrically conducting sliding member is elastically biased towards the second slideway, and
the elastic bias of the second, electrically conducting sliding member towards the second slideway is greater than the elastic bias of the electrically insulating sliding member with the spark gap to its associated slideway.

15. A wind turbine comprising first and second parts coupled with at least one discharge apparatus, wherein the discharge apparatus includes:
a charge transfer unit electrically connected to the first part, and
an electrically conductive slideway electrically connected to the second part, and rotatable relative to the charge transfer unit;
the charge transfer unit comprising:
a sliding member of an electrically insulating material and elastically biased towards the slideway to cause the sliding member to maintain mechanical contact with the slideway; and
a spark-gap electrode electrically connected to the first part and arranged to move in unison with the sliding member over the slideway at a distance over the slideway controlled by the sliding member,
the spark-gap electrode and the slideway thereby forming a spark gap with a spark-gap width controlled by the sliding member due to its elastic bias towards the slideway,
wherein discharging is enabled by sparks bridging the spark gap, whereas the first and second parts are electrically isolated from each other in the absence of a spark.

* * * * *